United States Patent [19]

Ahmann

[11] Patent Number: 4,712,757

[45] Date of Patent: Dec. 15, 1987

[54] PORTABLE VOTING BOOTH ADAPTER

[76] Inventor: John E. Ahmann, 1400 Duhig Rd., Napa, Calif. 94558

[21] Appl. No.: 906,941

[22] Filed: Sep. 15, 1986

[51] Int. Cl.⁴ ........................................ F16M 11/16

[52] U.S. Cl. .................................. 248/188; 403/186; 403/202

[58] Field of Search .................... 248/188, 188.1, 903; 403/389, 391, 202, 186; 108/153, 156; 312/255, 256

[56] References Cited

U.S. PATENT DOCUMENTS

| | | | |
|---|---|---|---|
| 3,134,566 | 5/1964 | Beene | 248/188 UX |
| 3,544,053 | 12/1970 | Ingalls | 248/903 X |
| 4,003,537 | 1/1977 | Mutchnik | 248/188 X |
| 4,301,985 | 11/1981 | Ballard | 248/188 |

*Primary Examiner*—Ramon O. Ramirez

*Attorney, Agent, or Firm*—Niro, Scavone, Haller & Niro

[57] ABSTRACT

An adapter device for portable voting booth serves to widen the space between front support legs. The adaptive device is comprised of two parallel, spaced apart cylindrical members, with coplanar lower end portions. The cylindrical members are connected together by a horizontal flange portion coplanar with, and extending beyond, the lower end portion perimeters thereof. One cylindrical member is inserted into a corner member of the portable voting booth from below, and the other cylindrical member is hollow and forms a socket which receives and grips a support leg inserted into the socket from below the voting booth. The cylindrical member and support leg socket member for the device are separated by a vertical flange portion tapered toward the cylindrical member which inhibits flexing of the support leg when the adapter device is in use.

8 Claims, 3 Drawing Figures

PORTABLE VOTING BOOTH ADAPTER

FIELD OF THE INVENTION

This invention relates to portable tables and the like and more particularly to an adapter device for changing the leg spacing on a portable voting booth.

BACKGROUND OF THE INVENTION

Portable voting booths have been developed which utilize punch-out type balloting devices as shown in U.S. Pat. Nos. 3,620,587; 3,806,219; and 4,445,731. Such portable booths are generally stored in a case similar to a metal suitcase. When opened and assembled, a lower portion of the case forms a table-like platform to support the voting device and has built-in socket receptacles to receive the upper ends of supporting legs. Fold-up shielding sections are also attached to the lower case portion to provde voter privacy. Vote recording devices are secured inside the bottom section of the case in various ways in the prior art and lamps are provided to facilitate the voting process.

Handicapped people, however, may not be able to utilize such portable voting booths due both to the spacing and height of the supporting legs. The portable voting booth as disclosed in U.S. Pat. No. 4,445,731, for example, has supporting legs about eighteen (18) inches apart and about forty-two (42) inches high. Such a voting booth neither meets Federal requirements for use by handicapped persons nor will it accommodate a conventional wheelchair, because the spacing of the supporting legs is too narrow. It is, therefore, a primary object of the invention to provide an adapter device which widens the space between the front support legs of a portable voting booth thereby enabling a handicapped person in a wheelchair to wheel into and beneath the voting surface of a self-contained portable voting booth.

Another object of the present invention is to provide an adapter device for portable voting booths which eliminates the need to obtain new voting booths with wider support bases.

Yet another object of the present invention is to provide an adapter device for portable voting booths which eliminates the need for various size voting booths which could neither be stacked nor stored in the same space.

Yet another object of the present invention is to provide an adapter device for portable voting booths that prohibits flexing of the support legs.

Still another object of the present invention is to provide an adapter device which is made of a lightweight, strong material that lends itself to ease and ecomony of manufacture.

SUMMARY OF THE INVENTION

The portable voting booth adapter of the present invention serves to widen the space between front support legs and is comprised of two generally cylindrical members connected together by a horizontal flange portion. One cylindrical member is hollow and forms a support leg socket for receiving the end of a support leg. The other cylindrical member is shaped to fit a support leg receiving socket of the portable voting booth from below, and is inserted through the bottom of the lower portion of the voting booth. The support leg socket member receives and grips a voting booth support leg inserted in the socket from below the voting booth. Both the support leg socket and cylindrical member are parallel to each other and angled slightly outward with coplanar lower end portions. The horizontal flange portion is coplanar with, and extends beyond, the perimeters of both the cylindrical member lower end portion and the support leg socket lower end portion. The extension of the horizontal flange portion provides for stability of the voting booth when the adaptive device of the present invention is in use.

The two cylindrical members on each adapter are separated by a vertical flange portion which is tapered toward the cylindrical member. The vertical flange portion inhibits any flexing of the support legs while the adaptive device is in use. The adaptive device is preferably of a unitary construction made of a polycarbonate material such as by an injection molding process. These features result in a stable voting booth with wider spacing between support legs.

These and other objects, advantages, features and characteristics of the invention will be apparent from the following description of a preferred embodiment, considered along with the accompanying drawing.

DETAILED DESCRIPTION OF THE PREFERRED EMBODIMENT

Figure 1:
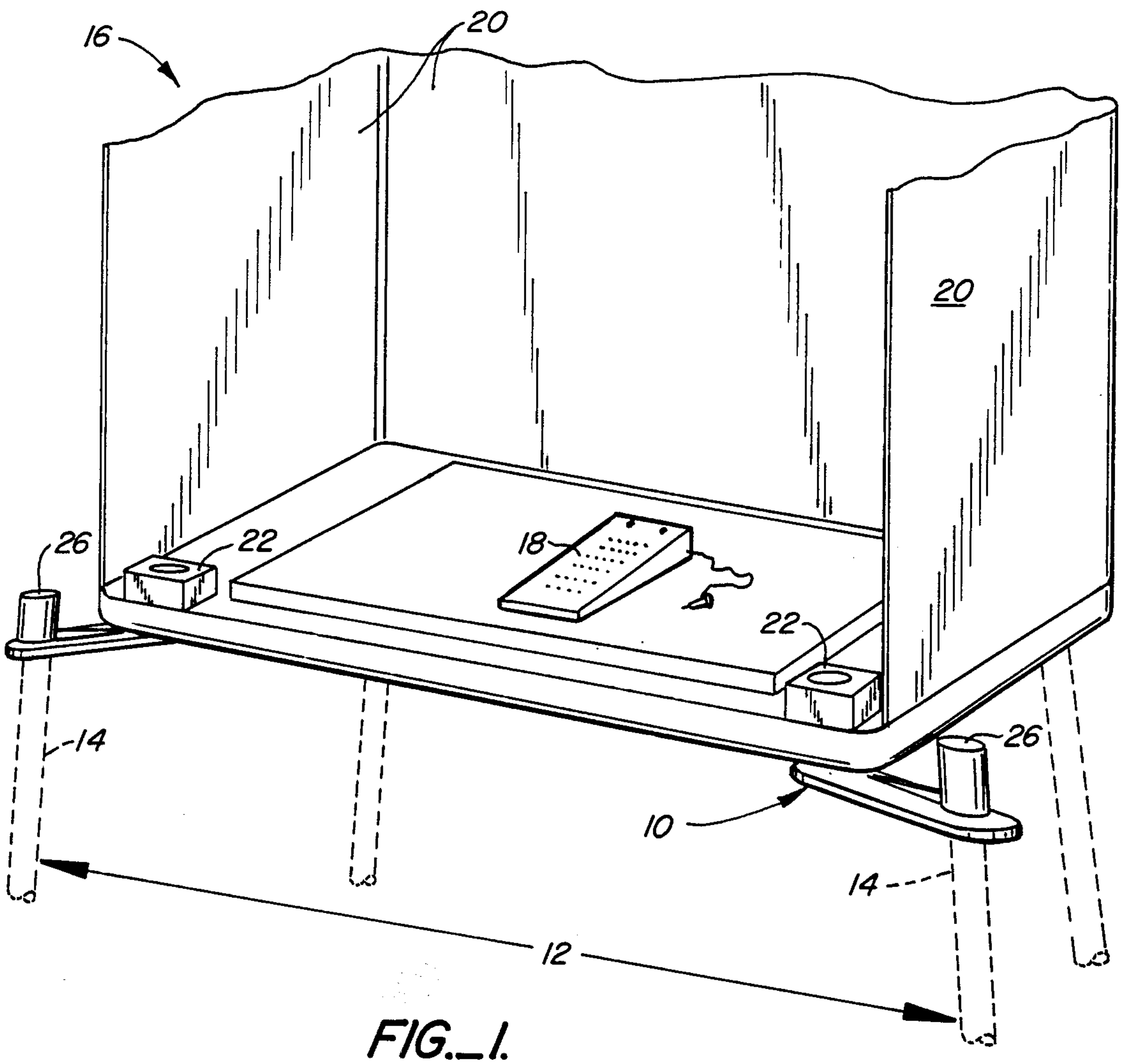
FIG. 1 is a perspective view of a portable voting booth in an assembled configuration utilizing the adapter device of the present invention.

In the drawing, FIG. 1 shows the adapter device 10 of the present invention in use serving to widen the space between front support legs 14 of a portable voting booth 16. The portable voting booth contains ballot means 18 and fold up shielding sections 20 to provide privacy during the voting process. The adapter device fits into both front corner members 22 of the voting booth 16 and receives the front support legs 14.

Figure 2:
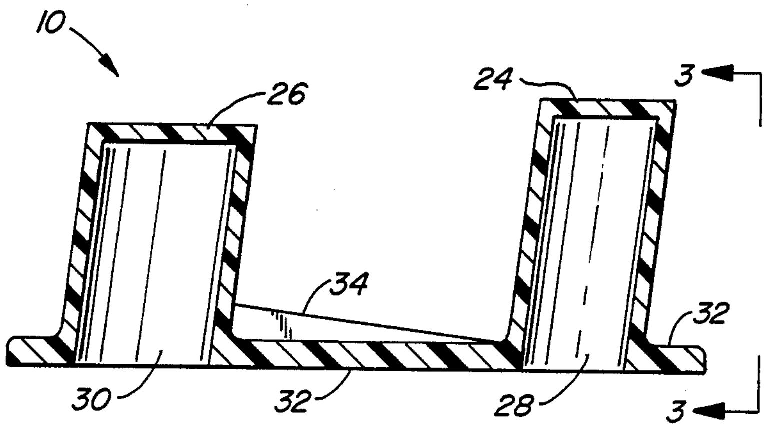
FIG. 2 is a side view in section of the adapter device.

The adapter device 10 is preferably made of a liquid plastic material such as by an injection molding process and comprises two parallel, spaced apart, generally cylindrical members 24, 26 with coplanar lower end portions 28, 30 respectively as FIG. 2 illustrates. The cylindrical members 24, 26 are angled slightly outward. The first cylindrical member 24 is shaped to fit into the voting booth front corner member 22 from below. The other cylindrical member 26 forms a support leg socket which receives and grips a voting booth front support leg 14 inserted into the socket 26 from below the voting booth 16. The cylindrical member 24 is narrower and longer than the support leg socket member 26 as FIG. 3 shows, and its added length increases stability when in use with the voting booth 16.

Figure 3:
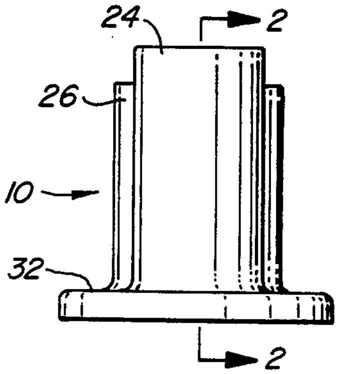
FIG. 3 is a view taken along the line 3—3 of FIG. 2.

The cylindrical member 24 and support leg socket member 26 are connected together by a horizontal flange portion 32 coplanar with, and extending beyond the perimeters of the lower end portions 28 and 30 as shown in FIGS. 2 and 3. The extension of the flange portion 32 provides for stability and prevents wobbling of the front support legs when the adapter device is in use. As shown in FIG. 2, the cylindrical member 24 and support leg socket member 26 are separated by a vertical flange portion 34, tapered toward the narrower cylindrical member 24. This vertical flange portion inhibits any flexing of the support leg while the adapter is in use.

The adapter device 10 can be quickly and easily installed to widen the space 12 between the front support legs of a portable voting booth 16 without placing the voting booth in an unstable configuration. Handicapped people in wheelcharis can now easily move beneath the voting booth 16 and tabulate their votes. Through the use of the present invention, it is not necessary to obtain new and different size voting booths to accommodate handicapped people.

The preferred embodiment described herein is intended to be purely illustrative, and not limiting in any sense. Other embodiments and variations will be apparent to those skilled in the art and may be made without departing from the essence and scope of the invention as defined in the following claims.

I claim:

1. For use on a portable voting booth having a planar table with spaced apart front and rear legs and socket means near its front corners adapted to receive the upper ends of the front legs, an adapter device for widening the distance between the front legs to facilitate use of the voting booth by a person in a wheelchair, said adapter device comprising:

a generally cylindrical male connector member adapted to fit within a socket means of said table;

a support leg socket member oriented downwardly at a spaced apart distance from, and parallel to, said connector member, its lower end portion being coplanar with the lower end portion of said connector member;

said connector member and said support leg socket member being connected together by a horizontal flange portion, coplanar with the lower end portions of both said cylindrical member and said support leg socket member, whereby when a front leg is placed in said support leg socket member of an adapter device and its said connector member is placed in a said table socket means, the distance between the table front legs of the voting booth is widened.

2. The adapter device of claim 1 wherein a vertical flange portion separates said cylindrical connector member and said support leg socket member.

3. The adapter device of claim 2 wherein said vertical flange portion is tapered toward said cylindrical connector member.

4. The adapter device of claim 1 wherein said horizontal flange portion extends beyond the perimeters of the lower end portions of both said cylindrical connector member and said support leg socket member.

5. The adapter device of claim 1 wherein said cylindrical connector member is longer than said support leg socket member.

6. The adapter device of claim 1 wherein both said cylindrical connector member and said support leg socket member are angled slightly outward.

7. The adapter device of claim 1 formed as an integral molded unit of polycarbonate or similar material.

8. An adapter device for use on a portable voting booth having a planar table with spaced apart front and rear legs and socket means for receiving said front legs, said device comprising:

a generally elongated male connector member adapted to fit within a socket means of said table;

a support leg socket member, wider and shorter than said male connector member oriented downwardly at a spaced apart distance from, and parallel to, said male connector member wherein the lower end portions of both said connector member and said support leg socket member are coplanar;

said connector member and said support leg socket member being angled slightly outward and separated by a vertical flange portion tapered toward said connector member; and said connector member and said support leg socket member being connected together by a horizontal flange portion coplanar with, and extending beyond, the perimeters of the lower end portions of both said connector member and said support leg socket member whereby when a front leg is placed in said support leg socket member of an adapter device and said connector member is placed in a said table socket means, the distance between the table front legs of the voting booth is widened.

* * * * *